United States Patent
Geddes et al.

(10) Patent No.: US 9,116,836 B2
(45) Date of Patent: Aug. 25, 2015

(54) TUNNELING TRANSACTION PACKETS

(71) Applicant: Marvell World Trade Ltd., St. Michael (BB)

(72) Inventors: David Geddes, Fremont, CA (US); Scott Furey, Cupertino, CA (US); Joseph Jun Cao, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/248,527

(22) Filed: Apr. 9, 2014

(65) Prior Publication Data

US 2014/0310430 A1 Oct. 16, 2014

Related U.S. Application Data

(60) Provisional application No. 61/810,473, filed on Apr. 10, 2013, provisional application No. 61/834,953, filed on Jun. 14, 2013.

(51) Int. Cl.
| | |
|---|---|
| *G06F 3/00* | (2006.01) |
| *G06F 13/12* | (2006.01) |
| *G06F 13/42* | (2006.01) |
| *G06F 13/38* | (2006.01) |

(52) U.S. Cl.
CPC ............ *G06F 13/122* (2013.01); *G06F 13/385* (2013.01); *G06F 13/426* (2013.01)

(58) Field of Classification Search
None
See application file for complete search history.

(56) References Cited

U.S. PATENT DOCUMENTS

| | | | | |
|---|---|---|---|---|
| 6,256,700 | B1 * | 7/2001 | Sauber | 710/316 |
| 6,874,042 | B2 * | 3/2005 | Sauber | 710/38 |
| 7,480,303 | B1 * | 1/2009 | Ngai | 370/395.5 |
| 7,694,047 | B1 | 4/2010 | Alston | |
| 2004/0230709 | A1 | 11/2004 | Moll et al. | |
| 2007/0165596 | A1 * | 7/2007 | Boyd et al. | 370/351 |
| 2009/0248947 | A1 * | 10/2009 | Malwankar et al. | 710/316 |
| 2010/0146160 | A1 | 6/2010 | Piekarski et al. | |
| 2012/0120959 | A1 * | 5/2012 | Krause | 370/392 |
| 2012/0166699 | A1 * | 6/2012 | Kumar et al. | 710/306 |

OTHER PUBLICATIONS

"International Search Report and Written Opinion", Application No. PCT/US14/33438, Aug. 19, 2014, 10 Pages.

* cited by examiner

*Primary Examiner* — Elias Mamo

(57) ABSTRACT

The present disclosure describes apparatuses and techniques for tunneling transaction packets. In some aspects a packet is received from a peripheral device via a first data interface of a device. The packet includes an address for resource access and an identifier that identifies the peripheral device or a function thereof. Based on this identifier, it is determined whether the peripheral device is attempting to access an internal resource of the device or a resource of a host device connected to a second data interface of the device. If the peripheral device is attempting to access the resource of the host device, the packet is routed to the host device via the second data interface without modifying the address for resource access. By so doing, the peripheral device can exchange data with the host device without using address translation.

20 Claims, 7 Drawing Sheets

TUNNELING TRANSACTION PACKETS

CROSS REFERENCE TO RELATED APPLICATIONS

This present disclosure claims priority to U.S. Provisional Patent Application Ser. No. 61/810,473 filed Apr. 10, 2013 and to U.S. Provisional Patent Application Ser. No. 61/834,953 filed Jun. 14, 2013, the disclosures of which are incorporated by reference herein in their entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices are often connected to peripherals to provide storage, networking, processing, or other computing capabilities. Interconnects or data busses of host devices that enable peripheral connection, however, are often limited by physical or logical access, such as physical port connections or logical address space, respectively. To address these limitations, some peripherals expand connectivity of the host device by replicating ports or logical address space through which additional peripherals can connect to the host device.

Access to resources of the host device through the replicated ports or logical address space, however, typically conflicts with access to internal resources of the peripheral providing the expanded connectivity. For example, a storage controller providing connectivity to a host device may include a large amount of internal memory that is not mapped to a memory space of the host device. Mapping the internal cache memory to a downstream peripheral device creates a blind spot in the host device's memory space for any downstream peripheral device when attempting to communicate with the host device. In other words, other peripheral devices connected to the host device through the storage controller cannot directly access (e.g., see into) the memory space of the host device if that memory space is mapped to the internal cache memory of the storage controller.

As such, attempts by other peripherals to access host device resources behind a blind spot are typically routed via a series of address translations that create windows into the host device's memory space behind the blind spot. While the use of these windows may permit access to an entire memory space of the host device, the windowing process introduces latency and processing overhead because transaction requests and associated data are cached at the intermediate peripheral (e.g., storage controller) while the address translations are set up to create a window. These latency issues are further compounded when concurrent transactions require address translation and windowing, as a subsequent transaction may be forced to wait for previous transactions to complete and release particular ranges of translated addresses (e.g., windows) before subsequent address translations can be initiated.

In some cases, a downstream peripheral is allowed to access host device resources by caching all data received from downstream peripheral devices to the internal cache memory. In such cases, the aforementioned address translation and latency issues apply to all transactions, even those transactions associated with addresses not behind a blind spot in the host device's memory space.

SUMMARY

The details of one or more implementations are set forth in the accompanying drawings and the description below. Other features and advantages will be apparent from the description and drawings. As such, this Summary should not be considered to describe essential features nor used to limit the scope of the claimed subject matter.

A method is described for receiving a packet from a peripheral device via a first data interface of a device having a first resource. The device is also connected via a second data interface to a host device having a second resource. The packet received from the peripheral includes an address for resource access and an identifier that identifies a function of the peripheral device. Based on the identifier of the packet, the method determines whether the peripheral device is attempting to access the first resource or the second resource. In response to determining that the peripheral device is attempting to access the second resource the method routes the packet to the host device via the second data interface without modifying the address for resource access.

Another method is described for receiving, from a peripheral, transaction packets via a first data interface of a device that includes an internal resource and is connected to another device via a second data interface. Each of the transaction packets has an address for resource access and one of at least two identifiers associated with a respective function of the peripheral device. The method then routes transaction packets having an identifier associated with a first of the at least two functions to the internal resource of the device. Alternately, the method may forward transaction packets having an identifier associated with a second of the at least two functions to the second data interface of the device. This can be effective to enable the second function of the peripheral device to access a resource of the other device without modifying the address of the transaction packet.

A System-on-Chip is described that includes a transaction packet tunneler that is configured to receive, via a first data interface, a transaction packet from a peripheral device. The transaction packet tunneler then determines, based on an identifier of the transaction packet, whether a function of the peripheral device is associated with a resource of a host device or a local resource. In response to determining that the function is associated with the resource of the host device, the transaction packet tunneler routes the transaction packet to the host device via the second data interface without modifying the address for resource access.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Host bus adapters (HBA) can increase computing capabilities or connectivity of a host device, such as by enabling the connection of additional peripherals. Conventional techniques for enabling a HBA-connected peripheral device (e.g., end point device) to access memory space of the host device, however, often rely on address translation and caching. Typically, internal resources of the HBA are mapped to an address range within the memory space of the host device, which creates a blind spot over that address range from the perspective of the peripheral. As such, when the peripheral attempts to access a resource of the host device behind the blind spot, transaction data of the peripheral device is cached by the HBA. Caching the transaction data can introduce considerable latency and overhead, particularly when multiple or concurrent data transactions are attempting to execute.

This disclosure describes apparatuses and techniques for tunneling transaction packets, which enable a peripheral device to directly access an address space of a host device without address translation or caching. In some aspects, transaction packets of the peripheral are routed to an internal resource of a host bus adapter or forwarded to a host device based on an identifier of the transaction packet (e.g., requestor ID). By so doing, transaction data of the peripheral can be transmitted to the host device without intermediate caching or address translation. This can be effective to reduce latency and overhead associated with data transactions between a host device and peripheral devices. Alternately or additionally, the HBA can configure and/or control other peripheral devices, enabling functionalities of the host device to be offloaded to the HBA.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
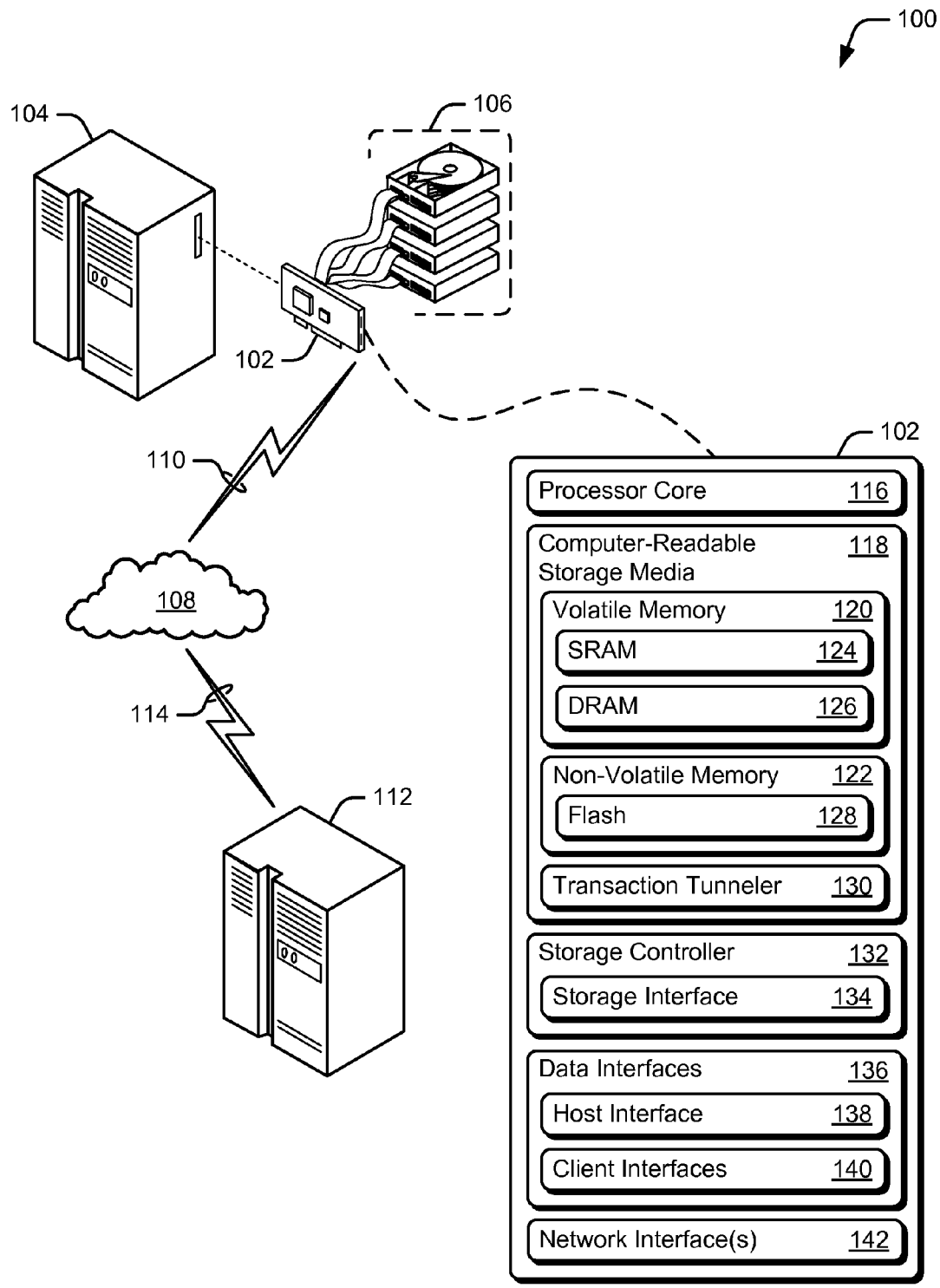
FIG. 1 illustrates an operating environment having a host bus adapter in accordance with one or more aspects.

FIG. 1 illustrates an example of an operating environment 100 having a host bus adapter 102, which is capable of communicating, accessing, processing, or storing various data. Host bus adapter 102 may be configured as, or to include, any suitable type of peripheral device, such as a network interface controller, storage controller, fiber-channel controller, memory controller, and the like. In this particular example, host bus adapter 102 is implemented as a storage controller with an on-board network interface controller.

Generally, host bus adapter 102 stores data of host device 104 via drive array 106 and communicates data of host device 104 via network 108. Host device 104 may include any suitable computing device, such as a server, desktop computer, workstation, server blade, and so on. Drive array 106 provides non-volatile storage memory for host device 104, and may include one or more solid-state, optical, or magnetic media drives. In some cases, drive array 106 is configured as an array of serial attached small computer system interface (SCSI) drives or an array of serial advanced technology attachment (SATA) drives.

Host bus adapter 102 communicates data over network 108 via communication link 110, which may be configured as a wireless link or wired link, such as Ethernet, fiber-channel, and the like. In this particular example, data communicated over network 108 can also be transmitted to remote host device 112 via communication link 114. In some cases, this permits host bus adapter 102 to redundantly store data written to drive array 106 to another drive array (not shown) of remote host device 112. By so doing, host bus adapter 102 can provide redundant data storage and/or high availability data storage services.

Configurations of host bus adapter 102 include a processor core 116 (e.g. reduced-instruction set computer (RISC) or ARM core) and computer-readable storage media 118 (CRM 118). Although shown as a single core, processor core 116 may be one of any suitable number and/or type of processing cores, which may be configured in any suitable manner (e.g., a heterogeneous multi-core application processor).

CRM 118 includes volatile memory 120 and non-volatile memory 122, which may include any suitable type, combination, or number of memory devices. In this particular example, volatile memory 120 includes static random access memory 124 (SRAM 124) and synchronous dynamic random-access memory 126 (DRAM 126). Alternately or additionally, volatile memory 120 may include other suitable types of memory, such as random-access memory (RAM), asynchronous dynamic RAM, double-data-rate RAM (DDR), and the like. In some cases, CRM 118 is configured as internal memory of host bus adapter 102 to which data is cached to prior to being written to drive array 106 or transmission via network 108.

Non-volatile memory 122 includes Flash 128, which may be configured to store boot code, operating systems, or firmware of host bus adapter 102. Other non-volatile memories contemplated include non-volatile RAM (NVRAM), read-only memory (ROM), NAND Flash, NOR Flash, serial peripheral interface (SPI) Flash, and the like.

CRM 118 also contains transaction tunneler 130, which in this particular example, is embodied as processor-executable instructions that are executable by processor core 116 to implement various functions. Alternately or additionally, transaction tunneler 130 may be implemented, in part or whole, via firmware or hardware (not shown) or any suitable combination thereof. In some cases, transaction tunneler 130 is implemented via hardware logic of host bus adapter 102. In some aspects, transaction tunneler 130 forwards transaction packets received from a peripheral to a host device without address translation or caching at a host bus adapter. The implementation and use of transaction tunneler 130 varies and is described below.

Host bus adapter 102 may also include storage controller 132, which may be configured as a serial attached SCSI (SAS) or SATA controller. Storage controller 132 includes storage interface 134 for communicating with storage devices, such as the storage devices of drive array 106. Storage interface 134 may include any suitable type or number of communication ports for writing data to or reading data from the storage devices.

Host bus adapter 102 also includes data interfaces 136 for communicating with host device 104 and other peripheral devices or components, such as other host bus adapters. Host bus adapter 102 communicates with host device 104 via host interface 138 and may communicate with other peripherals via client interfaces 104. The implementation and use of host interface 138 and client interfaces 140 vary and are described below.

In some cases, data interfaces 136 are configured as peripheral component interconnect express (PCIe) ports. In such cases, the PCIe ports can be configured with any suitable lane width, such as a x16 link, x8 link, x4 link, or x1 link. Alternately or additionally, one of the PCIe ports can be bifurcated into two or more links having less lane width. For example, a single x8 link can be split into two separate x4 links. Alternately or additionally, data interfaces 136 can be configured as either host interfaces or client interfaces. By so doing, host bus adapter 102 can be configured to support or implement multiple host interfaces, multiple client interfaces, or any combination thereof.

In this particular example, host bus adapter 102 also includes network interface 142, which provides connectivity to one or more networks and other devices connected therewith. Data communicated over network interfaces 142 may be packetized or framed depending on a communication protocol or standard by which host bus adapter 102 is communicating. Network interfaces 142 may include wired interfaces, such as Ethernet or fiber optic interfaces for communication over a local network, intranet, or the Internet. Network interfaces 142 may also include wireless interfaces that facilitate communication over wireless networks, such as wireless LANs, cellular networks, or wireless personal-area-networks (WPANs).

Figure 2:
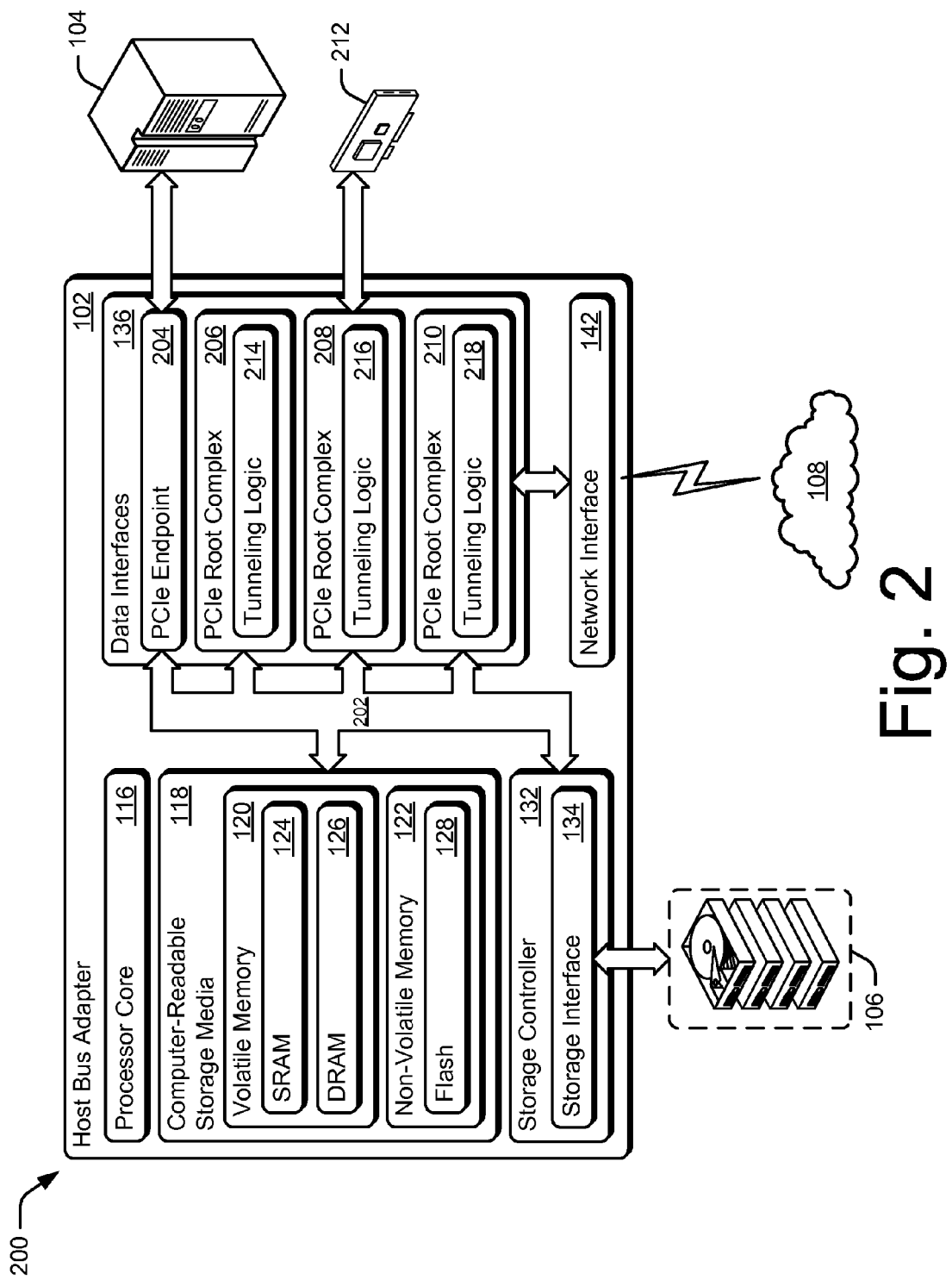
FIG. 2 illustrates an example system architecture of a host bus adapter in accordance with one or more aspects.

FIG. 2 illustrates an example system architecture of a host bus adapter 102 generally at 200. Internally, data of host bus adapter 102 is communicated via interconnect fabric 202, which enables data exchanges between CRM 118, storage controller 132, or data interfaces 136. For example, data can be written to, or read from, CRM 118 from any of data interfaces 136 via interconnect fabric 202. Host bus adapter 102 may also communicate data via external connections, such as those shown between storage interface 134 and drive array 106, and network interface 142 (e.g., fiber-channel controller) and network 108 (e.g., fiber-channel network).

In this particular example, data interfaces 136 are configured as PCIe ports, and include PCIe end point 204 and PCIe root complexes 206, 208, and 210 (root complexes 206, 208, and 210). End point 204 is connected to a PCIe root complex (not shown) of host device 104, which enables host bus adapter 102 to access resources of host device 104 and vice versa. PCIe root complexes 206, 208, and 210 may also include tunneling logic 214, 216, and 218, respectively, which may be implemented in conjunction with transaction tunneler 130. In some aspects, tunneling logic 214, 216, and 218 forwards transaction packets received from an end point to a root complex without address translation or caching at a host bus adapter. The implementation and use of transaction tunneling logic 214, 216, and 218 varies and is described below.

Root complexes 208 and 210 are respectively connected to SAS controller 212 and network interface 142, which are implemented as PCIe end points. Although described as end points or peripherals, either of SAS controller 212 or network interface 142 could be implemented as another host bus adapter. The respective connections to root complexes 208 and 210 enable SAS controller 212 or network interface 142 to communicate data via interconnect fabric 202 with resources of, or other devices attached to, host bus adapter 102. This is effective to enable these end points to communicate with host device 104 through host bus adapter 102. For example, SAS controller 212 can write data to CRM 118 of host bus adapter 102, a memory space of host device 104, or a network location via network interface 142.

Figure 3:
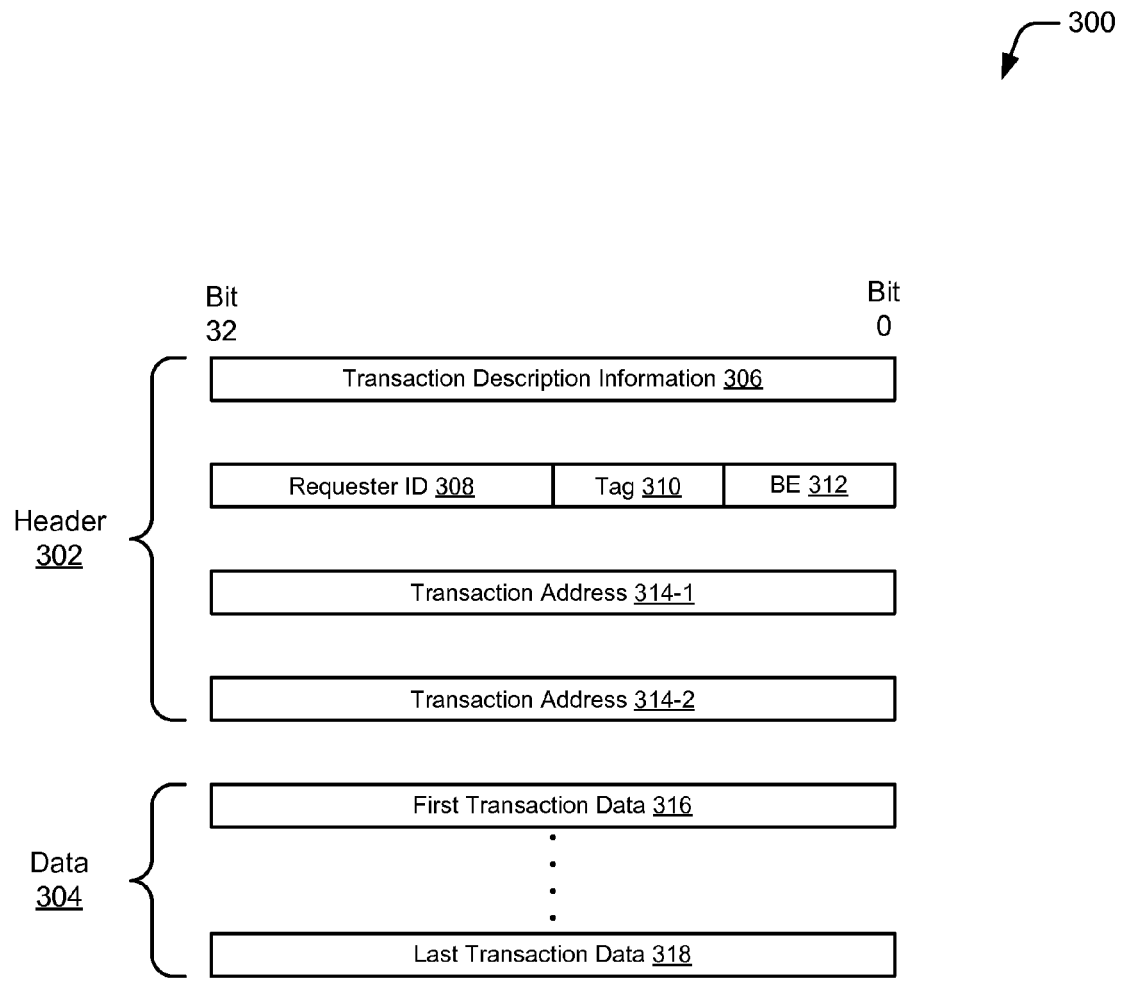
FIG. 3 illustrates an example of a transaction packet in accordance with one or more embodiments.

Generally, a PCIe end point and a PCIe root complex can exchange data, or access resources of the other PCIe device, via a 32-bit or 64-bit address space. For example, transactions originated by an end point can access a 64-bit address space of a root complex to which the end point is attached. Data exchanges (e.g., 110 operations), such as read or write operations between PCIe devices, are implemented using transaction layer packets (TLPs), which are referred to herein as transaction packets. FIG. 3 illustrates an example transaction packet for a write transaction generally at 300. Here, the transaction packet is shown as a write transaction packet that includes header 302 of transaction information, and data 304, which includes the data to be written at the target or destination. Alternately, a read transaction packet may only include header 302 because data requested by a read operation will be returned by a corresponding read completion packet.

Header 302 includes transaction description information 306, which describes a format, type, or length of a transaction packet or associated data. Header 302 also includes requestor identification 308 (requestor ID 308) that identifies the PCIe device from which the transaction packet originates as the requestor of the transaction. Typically, requestor ID 308 is set to zero for transaction packets sent by a root complex, which can be inherently determined as the packet originator to attached end points. When a transaction packet originates from an end point, however, the requestor ID 308 identifies the originating end point as the source of the transaction packet. In some cases, each end point can be configured to use multiple requestor IDs 308 for transmitting transaction packets. In such cases, a different requestor ID 308 can be assigned to each respective function of an end point, thereby enabling each function of the end point to generate transaction packets having a different requestor ID 308.

Header 302 also includes a tag 310, byte enable bits 312 (BE 312), and a transaction address, which is shown as two 32-bit double words at 314-1 and 314-2. Tag 310 is used as a tracking number for completing transactions, and is typically set by a requestor of a transaction and copied into a return transaction packet generated by a completer of the transaction. Byte enable bits 312 can be used to indicate which bytes of data 304 is valid, and thus which bytes are to be written to a resource. Transaction address may be a 32-bit address (shown as 314-1) or a 64-bit address (shown as 314-1 and 314-2) at which data is accessed. In some cases, the transaction address describes an address within an address space of a root complex, such as an address within memory of a host device 104. In other cases, transaction address 314 describes an address within an address space of an end point 102, such as an address of a register (e.g., control register or configuration register) of a storage controller or of a memory, such as DRAM within a storage controller.

Data 304, if included in the transaction packet, comprises one or more bytes of data that follow header 302 starting with first transaction data 316 and ending with last transaction data 318. As described in association with header 302, information within the header description fields can describe a length, or amount, of data within the transaction packet of which specific bytes of data are valid, such as when less than a complete double-word of data is sent (e.g., one to three bytes). Once received by an end point or root complex, data 304 can be written into a resource based on transaction address 314. As such, end points and root complexes associated with host bus adapter 102 communicate data with each other via these transaction packets.

Functions of an end point can be configured or mapped to resources of the end point in any suitable manner, such as logically, functionally, and so on. Alternately or additionally, in systems implementing single root I/O virtualization (SR-IOV), each function of an end point can be identified using a physical function or virtual function. By way of example, consider a SAS I/O end point that is configured to generate read or write operations. Here, the first function (physical function 0) of the end point can be configured to generate transactions whose destination is CRM 118 in the Host Bus Adapter and the second function (virtual function 1) of the end point can be configured to generate transactions whose destination is memory in host 104. By so doing, transaction packets originating from the SAS I/O end point can be identified, by requestor ID, as being intended for internal resources (e.g. 118) in the Host Controller or intended for memory in host system 104.

In some aspects, host bus adapter 102 acts as arbiter for transaction packets communicated via end points, such as network interface 142 and SAS controller 212, and the root complex of host device 104. To avoid address translation and windowing, transaction tunneler 130 of host bus adapter 102 can tunnel (e.g., forward) transaction packets from one PCIe port to another PCIe port without changing an address of the transaction packets.

Figure 4:
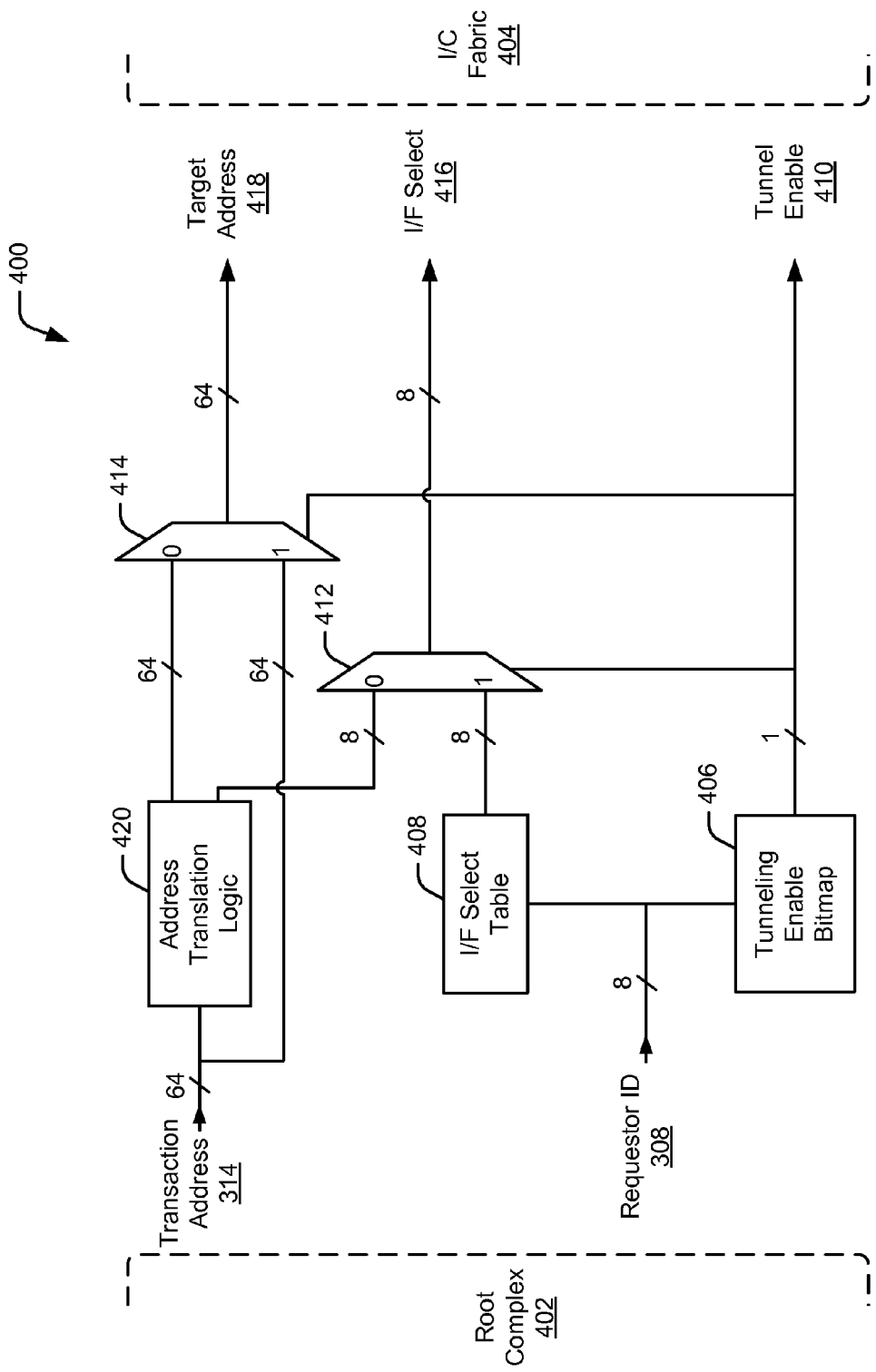
FIG. 4 illustrates an example of transaction packet tunneling logic in accordance with one or more aspects.

FIG. 4 illustrates an example of tunneling logic at 400, which can be configured to tunnel inbound transaction packets received from a root complex to another PCIe port. Tunneling logic 400 may be implemented in whole, or part, via transaction tunneler 130 and/or tunneling logic 214-218 as described with respect to FIGS. 1 and 2. In some cases, a root complex section of each PCIe port of host bus adapter 102 includes an instance of tunneling logic 400. Although illustrated using a particular configuration of logic and values, tunneling logic 400 may be implemented using any suitable combination of logical blocks, tables, maps, operators, values, and the like.

Generally, tunneling logic 400 routes transaction packets received from root complex 402, which may be implemented via any PCIe port of host bus adapter 102 that is configured as a root complex. From root complex 402, the transaction packets are directed to an interconnect fabric 404 (I/C fabric 404), which may be implemented as interconnect fabric 202 as described with respect to FIG. 2. In at least some aspects, I/C fabric 404 may be configured as an advanced extensible interface (AXI) fabric.

In some aspects, tunneling logic 400 routes transaction packets based on requestor ID 308, which indicates an identity of an end point from which the transaction packet is received. In some cases, the requestor ID 308 indicates a physical function or virtual function of the end point that generated the transaction packet. Accordingly, tunneling logic 400 can be configured to route transaction packets sent from particular end points and received by root complex 402, or specific functions thereof, to an internal resource or to another PCIe port via tunneling. By so doing, each function of an end point can be mapped to internal resources of host bus adapter 102 or to another device connected to another PCIe port of the host bus adapter 102.

As shown in FIG. 4, an 8-bit requestor ID associated with a transaction packet is received by tunneling enable bitmap 406 (enable bitmap 406) and interface select table 408 (I/F table 408). Tunneling enable bitmap 406 and interface select table 408 may be implemented separately (as shown) or combined (not shown), such as by adding a $9^{th}$ bit to interface select table 408 to enable the functionality of tunneling enable bitmap 406. In some cases, enable bitmap 406 is configured as a 256-bit bitmap, which permits tunneling to be configured for up to 256 requestor IDs represented by the 8-bit requestor ID. Each of these requestor IDs may also correspond to a unique physical or virtual function of one or more end points attached to root complex 402. To enable tunneling for a specific function or end point, an enable bit can be set for a requestor ID of that specific function or end point. Alternately or additionally, to disable tunneling for a function or end point, an enable bit can be reset (or not set) for a requestor ID of a function or end point that is mapped to an internal resource of host bus adapter 102. When an enable bit is set for an incoming requestor ID, tunnel enable bit 410 sets multiplexors 412 and 414, which are configured to provide an interface select value 416 and target address 418, respectively.

Multiplexor 412 receives interface select values from interface select table 408 and address translation logic 420. When tunnel enable bit 410 is set, interface select table 408 can provide different interface select values 416 based on the requestor ID of an incoming transaction packet. In some cases, interface select table 408 includes 256 interface select values, some of which enable transaction packets to be routed through I/C fabric 404 to an outgoing PCIe port. For example, one requestor ID 308 may select an entry in the interface select table that specifies an interface select value 416 that routes transaction packets to a function of a PCIe port configured as an end point. The identifier of the function to which the transaction packet routed may be the same as, or different from, an identifier of the function from which the packet is received. Alternately or additionally, one requestor ID 308 may indicate selection of an entry in the interface select table that specifies an interface select value 416 that routes transaction packets to a PCIe port configured as a root complex. When tunnel enable bit 410 is not set, multiplexor 412 provides interface select value 416 received from address translation logic 420 to direct the transaction packet to an internal resource of host bus adapter 102.

Multiplexor 414 receives address values from a header of the incoming transaction packet and from address translation logic 420. When tunnel enable bit 410 is set, multiplexor 414 bypasses address translation logic 420 and provides target address 418 using the address value of the incoming transaction packet (e.g., transaction address 314). Thus, when tunneling is enabled, transaction packets are forwarded to I/C fabric 404 using an interface select value 416 provided by, or modified based on, the I/F Select table 408 and an unmodified target address 418.

Alternately, when tunnel enable bit 410 is not set, multiplexor 414 provides target address 418 using an address generated by address translation logic 420 to direct the transaction packet to an internal resource of host bus adapter 102. Thus, when tunneling is not enabled, transaction packets are directed to the internal resource of host bus adapter 102 using an interface select value 416 and target address 418 provided by address translation logic 420.

Techniques for Tunneling Transaction Packets

The following discussion describes techniques for tunneling transaction packets through a host adapter. These techniques can be implemented using the previously described environment or entities, such as transaction tunneler 130 of FIG. 1 or tunneling logic 400 of FIG. 4 embodied on a host bus adapter 102. These techniques include methods illustrated in FIGS. 5 and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2-4 by way of example. Such reference is not to be taken as limited to operating environment 100 but rather as illustrative of one of a variety of examples.

Figure 5:
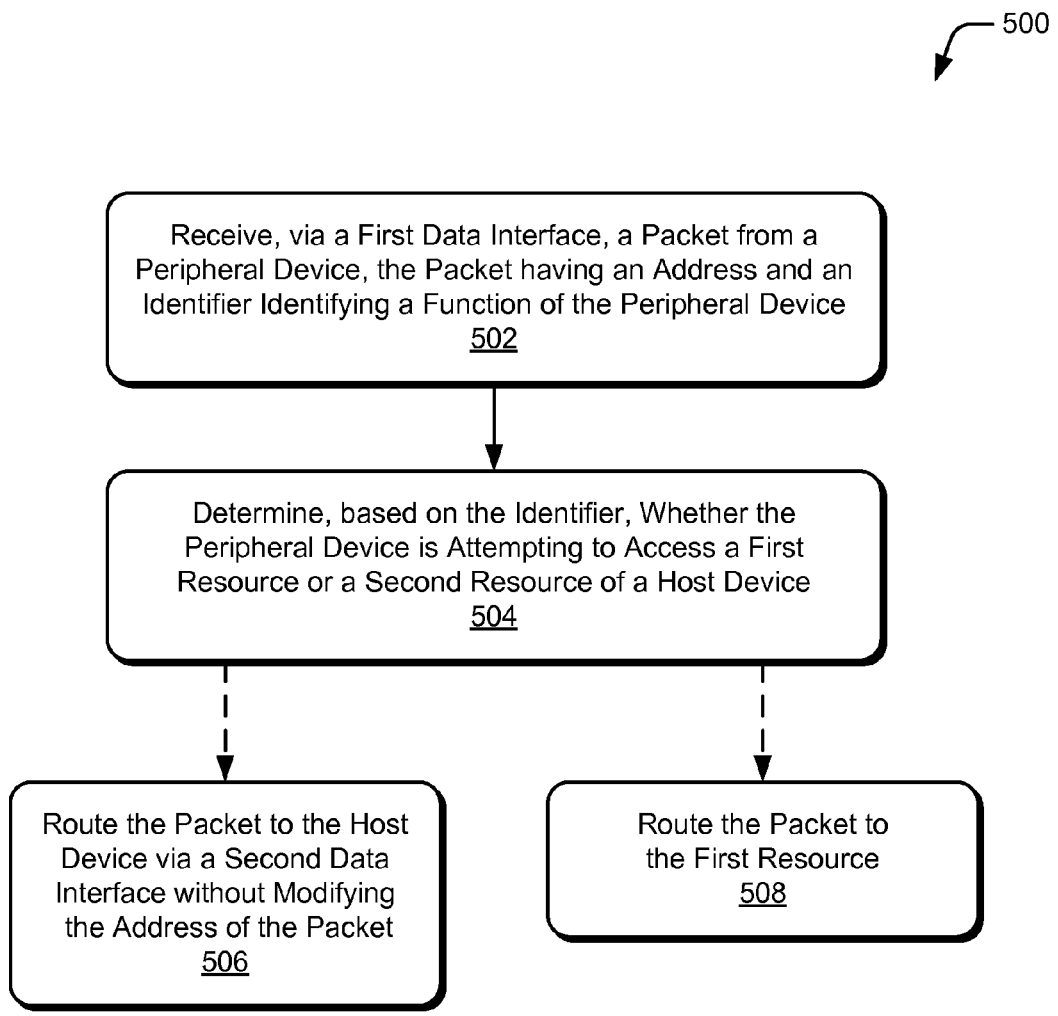
FIG. 5 illustrates an example method of routing a transaction packet to a host device without modifying an address field of the packet.

FIG. 5 depicts a method 500 for routing a transaction packet to a host device without modifying an address of the packet, including operations performed by transaction tunneler 130 of FIG. 1.

At 502, a packet is received from a peripheral device via a first data interface of a device having an internal resource, such as a host bus adapter. The device is also coupled via a second data interface with another device having a resource, such as host device. The data interfaces may be configured as any suitable packet-based interface, such as a PCIe root complex or PCIe end point. In some cases, the packet is a transaction packet received from the peripheral includes an address for resource access and an identifier that identifies the peripheral from which the packet is received.

By way of example, consider host bus adapter 102 as shown in FIG. 2, in which host bus adapter 102 is connected via PCIe links to host device 104, SAS controller 212, and network interface 142 (via an internal PCIe link). Here, host bus adapter 102 receives transaction packets from SAS controller 212 via PCIe root complex 208, which includes tunneling logic 216. Assume here that tunneling logic is configured for pass-through control and pass-through data, such that all control traffic and data transactions are tunneled through host bus adapter 102 to host device 104. Accordingly, requestor IDs associated with functions of SAS controller 212 are mapped to corresponding outgoing requestor IDs of PCIe end point 204, which enables the transaction packets to be tunneled to host device 104.

At 504, it is determined whether the peripheral device is attempting to access the internal resource of the device or the resource of the other device. This determination is based on the identifier of the transaction packet, such as a requestor ID that identifies a function within the end point from which the transaction packet originated. In some cases, each requestor ID of one or more functions is mapped to either an internal resource or to another device. In such cases, transaction packet tunneling to the other device is enabled based on a requestor ID of an incoming transaction packet.

In the context of the present example, tunneling logic 216 determines that the transaction packets received from SAS controller 212 are to be tunneled to host device 104 based on the requestor IDs of the transaction packets. Accordingly, tunneling functions of tunneling logic 216, such as an interface select table are set to enable the transaction packets to be tunneled through interconnect fabric 202.

Optionally at 506, the packet is routed to the other device in response to determining that the peripheral is attempting to access the resource of the other device. The packet can be routed to the other device without modifying the address for resource access. Alternately or additionally, an interface select value or requestor ID of the transaction packet may be modified to enable that logic of an interconnect fabric to route the transaction packet to an outgoing data interface.

Continuing the ongoing example, tunneling logic 216 assigns the interface select value for the transaction packets received from memory and control functions of SAS controller 212. This enables the transaction packets to be routed to PCIe end point 204, and thus host device 104, without modifying the addresses of the transaction packets. By so doing, the transaction packets of SAS controller 212 can be tunneled through host bus adapter 102 without using window translation windows.

Optionally at 508, the packet is routed to the internal resource of the device in response to determining that the peripheral is attempting to access the internal resource. The packet can be routed to the internal resource by modifying the address or the identifier of the packet, such as by using address translation.

Concluding the present example, tunneling logic 216 routes transaction packets for non-tunneled functions to internal resources of host bus adapter 102, such as SRAM 124 or DRAM 126. To do so, tunneling logic 216 uses address translation to provide modified address and interface select values for the transaction packets directed to the internal resources. By so doing, these transaction packets can access an entire address range of the internal resources without obscuring an address space of a host device.

Figure 6:
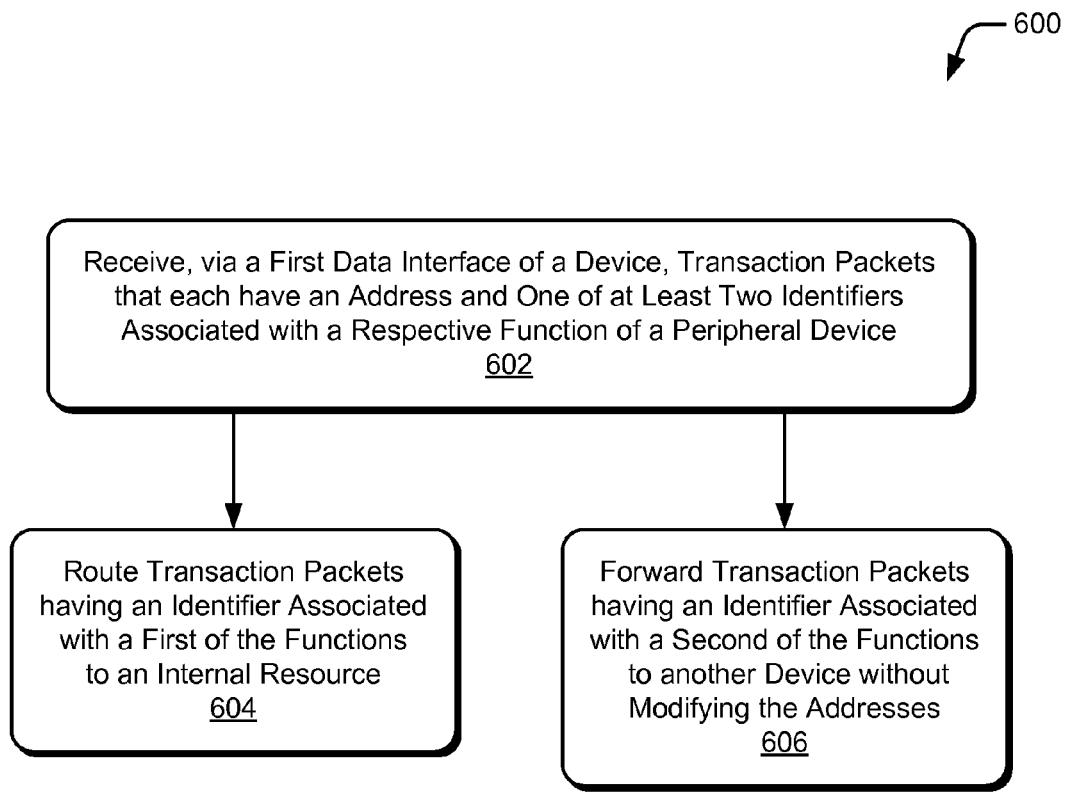
FIG. 6 illustrates a method for forwarding transaction packets based on a function of a peripheral device.

FIG. 6 depicts a method 600 for forwarding transaction packets based on a function of a peripheral device, including operations performed by transaction tunneler 130 of FIG. 1.

At 602, transaction packets are received via a first data interface of a device. The device includes an internal resource and is connected via a second data interface with another device having another resource. Each of the transaction packets may include a respective address for resource access, such as a 32-bit or 64-bit transaction address. Each of the transaction packet may also include an identifier that identifies a source of the transaction packet, such as a function of peripheral device (e.g., a PCIe end point) that generated the transaction packet.

By way of example, again consider host bus adapter 102 as shown in FIG. 2, in which host bus adapter 102 is connected via PCIe links to host device 104, SAS controller 212, and network interface 142 (via an internal PCIe link). Assume here that tunneling logic is configured for local control with internal data or pass-through data transactions, such that data transactions can access internal memory of host bus adapter 102 or tunnel through to host device 104. Accordingly, a first requestor ID associated with a first physical function of SAS controller 212 is mapped to internal memory of host bus adapter 102 and a second requestor ID associated with a second physical function of SAS controller 212 is mapped to host device 104.

At 604, transaction packets having an identifier associated with a function of a peripheral are routed to the internal resource. The identifier may indicate that the transaction packet originated from a physical or virtual function of a particular peripheral or end point. The transaction packets may be routed to the internal resource by modifying the address of the transaction packets and/or assigning an interface select value of an internal resource. In the context of the present example, tunneling logic 216 uses address translation logic to route transaction packets having the first requestor ID across interconnect fabric 202 to internal memory of host bus device 102.

At 606, transaction packets having an identifier associated with another function of the peripheral are forwarded to the other device. The transaction packets can be forwarded without modifying an address of the transaction packet. Concluding the present example, tunneling logic 216 alters interface selection information to tunnel transaction packets having the second requestor ID across interconnect fabric 202 to an outgoing PCIe port to host device 104. By so doing, the transaction packets can be tunneled to host device 104 without address translation, which precludes the introduction of latency and overhead associated with managing address translation for external devices.

System-on-Chip

Figure 7:
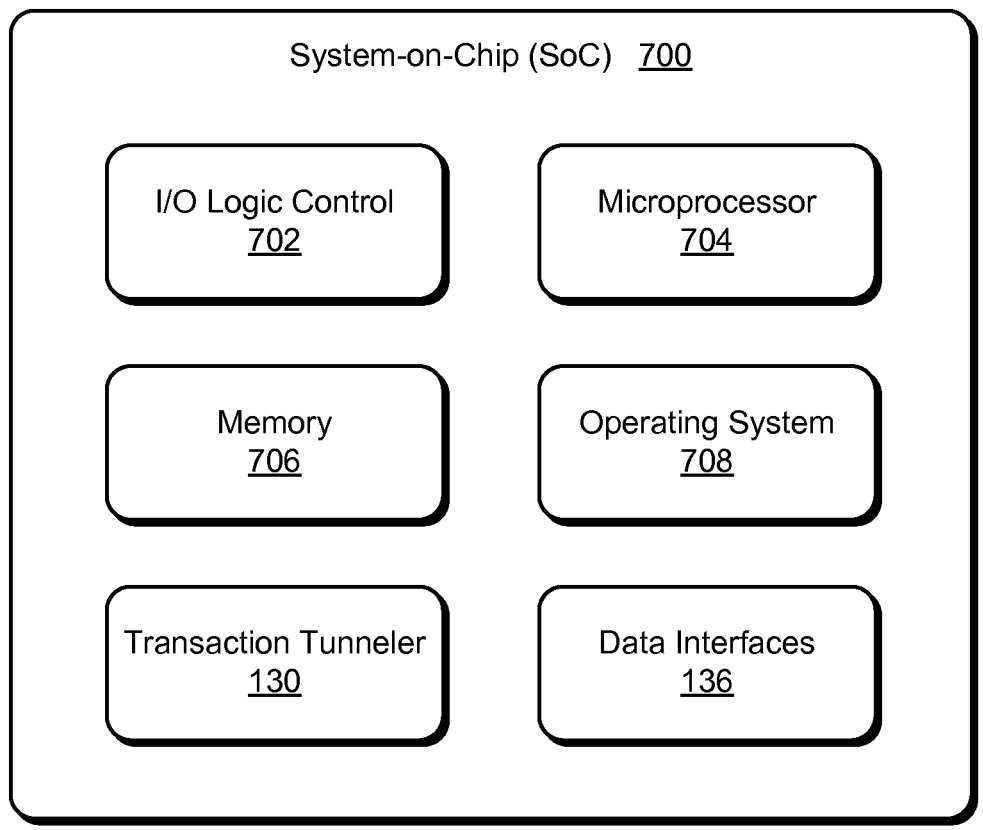
FIG. 7 illustrates a System-on-Chip (SoC) environment for implementing aspects of the techniques described herein.

FIG. 7 illustrates a System-on-Chip (SoC) 700, which can implement various aspects of tunneling transaction packets through a host adapter. A SoC can be implemented in any suitable device, such as a video game console, IP-enabled television, smart-phone, desktop computer, laptop computer, access point, wireless router, cellular broadband router, tablet computer, server, network-attached storage (NAS) device network-enabled printer, set-top box, printer, scanner, camera, picture frame, home appliance, thermostat, home automation device, and/or any other type of electronic device.

SoC 700 can be integrated with electronic circuitry, a microprocessor, memory, input-output (I/O) logic control, communication interfaces, other hardware, firmware, and/or software needed to provide functionalities of a device, such as any of the above-listed devices. SoC 700 can also include an integrated data bus (not shown) that couples the various components of the SoC for data communication between the components. A memory storage device that includes SoC 700 can also be implemented with many combinations of differing components. In some cases, these differing components may be configured to implement concepts described herein over various internal or external data interfaces.

In this example, SoC 700 includes various components such as an input-output (I/O) logic control 702 (e.g., to include electronic circuitry) and microprocessor 704. SoC 700 also includes memory 706, which can be any type and/or combination of RAM, SRAM, DRAM, Flash, low-latency nonvolatile memory, ROM, one-time programmable (OTP) memory, and/or other suitable electronic data storage. Alternately or additionally, SoC 700 may comprise data interfaces (not shown) for accessing additional or external off-chip memory, such as external SRAM, DRAM, or Flash memory. SoC 700 can also include various firmware and/or software, such as operating system(s) 708, which can be computer-executable instructions maintained by memory 706 and executed by microprocessor 704. SoC 700 may also include other various communication interfaces and components embodied as hardware, firmware, software, or any suitable combination thereof.

SoC 700 also includes transaction tunneler 130 and data interfaces 136 (either of which may embodied as disparate or combined components). Examples of these various components, functions, and/or entities, and their corresponding functionality, are described with reference to the respective components of the environment 100 and various configurations as illustrated by FIGS. 2-4. Transaction tunneler 130, either independently or in combination with other entities (e.g., storage controller 132), can be implemented as computer-executable instructions maintained by memory 706 and executed by microprocessor 704 to implement various embodiments and/or features described herein. Transaction tunneler 130 may also be provided integral with other entities of the SoC, such as integrated a memory controller associated with memory 706 or another suitable software, firmware, or hardware component within SoC 700. Alternatively or additionally, transaction tunneler 130 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   receiving, via a first data interface of a first peripheral component interconnect express (PCIe) device having a first resource and being connected via a second data interface to a second PCIe device having a second resource, a packet from a PCIe peripheral device connected to the first data interface, the packet having an address for resource access and a requestor identifier (RID) identifying a function of the PCIe peripheral device;
   determining, based on the RID of the packet, whether the peripheral device is attempting to access the first resource of the first PCIe device or the second resource of the second PCIe device;
   if the peripheral PCIe device is attempting to access the first resource, modifying the address for resource access effective to route the packet to the packet to the first resource of the first PCIe device; and
   if the peripheral PCIe device is attempting to access the second resource, routing, without modifying the address for resource access, the packet to the second PCIe device via the second data interface.

2. The method of claim 1 wherein, first resource comprises a local resource of the first PCIe device that is accessible via the modified address for resource access.

3. The method of claim 1, wherein the function identified by the RID is a physical function or a virtual function of the PCIe peripheral device.

4. The method of claim 1, wherein the first and second resources are accessible via respective address spaces and the respective address space of the first resource overlaps with at least a portion of the respective address space of the second resource.

5. The method of claim 1, wherein the first data interface or the second data interface is a PCIe compliant data interface.

6. The method of claim 5, wherein the first data interface is configured as a root-complex PCIe port and the second data interface is configured as an end point PCIe port.

7. The method of claim 5, wherein the first data interface is configured as a root-complex PCIe port and the second data interface is configured as another root-complex PCIe port.

8. A method comprising:
   receiving, via a first data interface of a peripheral component interconnect express (PCIe) device having an internal resource and being connected to another PCIe device via a second data interface, transaction packets from a PCIe peripheral device, each of the transaction packets having an address for resource access and one of at least two requestor identifiers (RIDs) associated with a respective function of the PCIe peripheral device;
   routing, by modifying the address for resource access, transaction packets having an RID associated with a first of the at least two functions of the PCIe peripheral device to the internal resource of the PCIe device effective to enable the first function of the peripheral device to access the internal resource of the PCIe device; and
   forwarding, without modifying the address for resource access, the transaction packets having an RID associated with a second of the at least two functions of the PCIe peripheral device to the second data interface of the PCIe device effective to enable the second function of the PCIe peripheral device to access a resource of the other PCIe device.

9. The method of claim 8, wherein the RID associated with the second of the at least two functions is an incoming RID and forwarding the transaction packets comprises modifying the incoming RID to provide an outgoing RID that is different from the incoming RID and transmitting the packets via the second data interface using the outgoing RID.

10. The method of claim 8, wherein the second data interface of the device is configured as:

a PCIe end point connection and the other PCIe device is a host device; or a PCIe root complex connection and the other PCIe device is another PCIe peripheral device.

11. The method of claim 8, further comprising forwarding, without modifying the address for resource access, transaction packets having a RID associated with a third of the at least two functions of the PCIe peripheral device to the second data interface of the PCIe device effective to enable the third function of the PCIe peripheral device to access the resource of the other PCIe device.

12. A System-on-Chip comprising:
   a first data interface through which transaction packets are received from a PCIe peripheral device, each of the transaction packets having an address for resource access and one of at least two requestor identifiers (RIDs) identifying a respective function of the peripheral device from which the transaction packet originated;
   a second data interface through which a resource of a PCIe device is accessible;
   a third data interface through which a local resource is accessible; and
   a transaction packet tunneler to perform operations comprising:
      receiving, via the first data interface, transaction packets from the PCIe peripheral device;
      determining, based on the RID of each transaction packet, which resource the respective functions of the peripheral device are attempting to access;
      responsive to determining that one of the respective functions of the peripheral device is attempting to access the resource of the PCIe device, routing, without modifying the address for resource access, the transaction packets of the respective function to the PCIe device via the second data interface effective to enable the respective function of the peripheral to access the resource; and
      responsive to determining that another of the respective functions of the peripheral device is attempting to access the local resource, routing, by modifying the address for resource access, the transaction packets of the other respective function to the local resource via the third data interface effective to enable the other respective function of the peripheral to access the local resource.

13. The System-on-Chip of claim 12, wherein the respective functions of the PCIe peripheral device identified by the RID of each transaction packet are physical functions or virtual functions of the PCIe peripheral device.

14. The System-on-Chip of claim 12, wherein the System-on-Chip is embodied, in whole or in part, as a PCIe host bus adapter or a PCIe storage controller.

15. The System-on-Chip of claim 14, wherein the PCIe host bus adapter or the PCIe storage controller is configured to enable the PCIe device, when configured as a host device, to communicate with one of:
   a serial attached small computer system interface (SCSI) storage entity;
   a serial advanced technology attachment (SATA) storage entity;
   a wired communication link;
   a wireless communication link; or
   a fiber-channel communication link.

16. The System-on-Chip of claim 12, wherein the System-on-Chip further comprises a local memory and wherein the transaction packets of the respective function are routed to the PCIe device via the second data interface without storing the transaction packets to the local memory of the System-on-Chip.

17. The System-on-Chip of claim 12, wherein the System-on-Chip further comprises address translation logic, an interface select table, or a tunneling bitmap configured to enable, at least in part, the operations of determining or routing.

18. The method of claim 1, wherein the RID of the packet identifies the function of the PCIe peripheral device that generated the packet.

19. The method of claim 1, wherein the packet is a transaction layer packet and the RID and the address for resource access are located in a header of the translation layer packet.

20. The method of claim 1, wherein routing the packet to the second PCIe device via the second data interface comprises modifying the RID of the packet.

* * * * *